Nov. 2, 1926.
L. C. BAYLES
1,604,958
HAMMER TYPE EXTRACTOR
Filed June 23, 1925
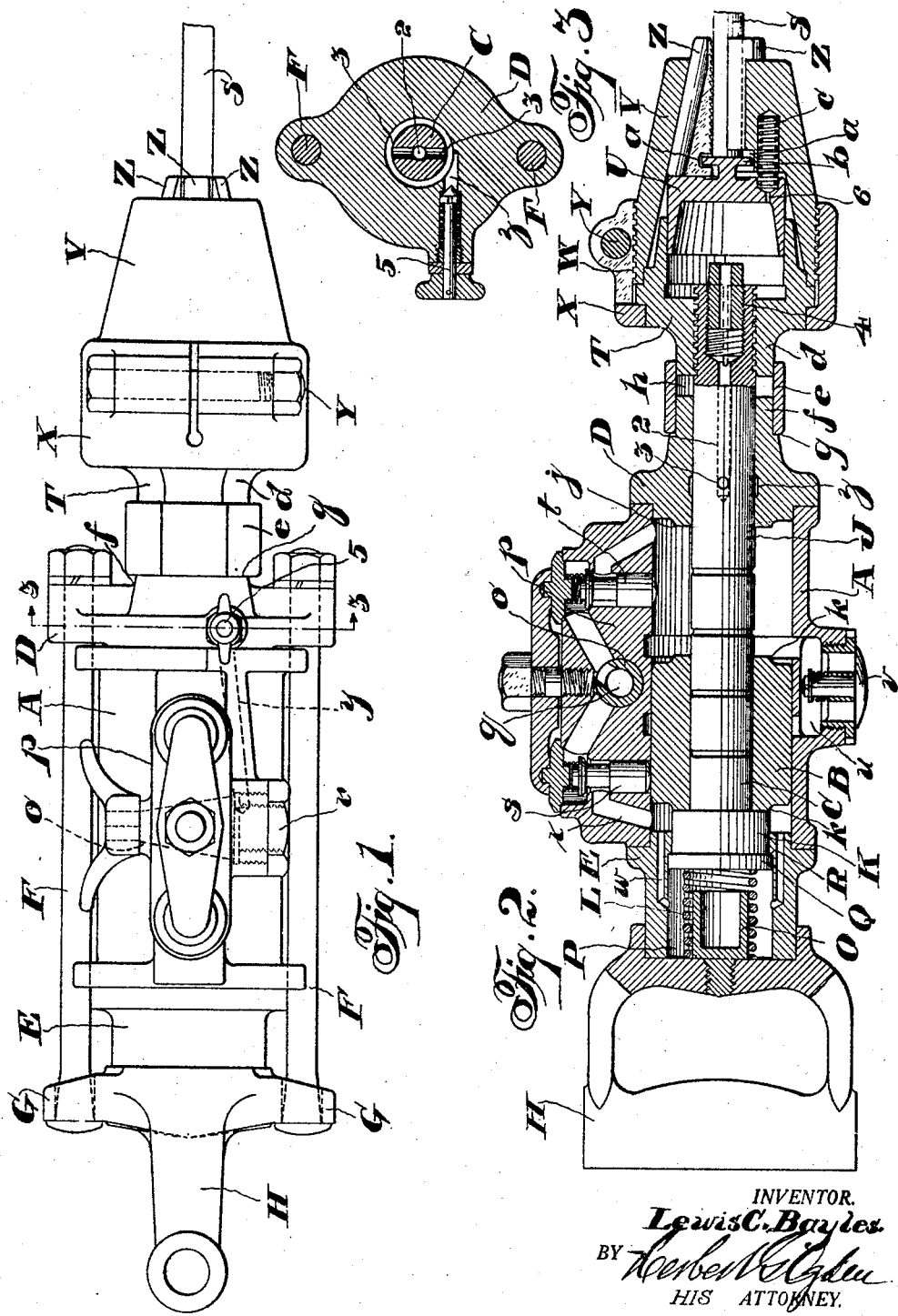
INVENTOR.
Lewis C. Bayles.
BY Herbert C. Ogden
HIS ATTORNEY.

Patented Nov. 2, 1926.

1,604,958

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

HAMMER-TYPE EXTRACTOR.

Application filed June 23, 1925. Serial No. 38,985.

This invention relates to fluid actuated hammer type machines, but more particularly to a hammer type extractor which may be used for extracting core rods from cores or for extracting any rod, pin or tool from the means which may be holding the same.

The objects of the invention are to enable a core rod, for instance, which is firmly embedded in the sand core of a casting to be extracted by means of a hammer device which will hammer the rod out of the core and may also impart blows of impact to the rod to drive the rod forwardly and thus loosen it in case it cannot be extracted solely by rearwardly directed blows.

I am enabled to accomplish this object by providing two relatively movable impact members in the hammer cylinder, one of which is provided with means for gripping or holding the rod or pin to be extracted, the other member being actuated by pressure fluid to impart blows of impact in a rearward direction directly to the pin carrying member. By shifting the relative longitudinal position of the pin carrying member of the cylinder, the piston is prevented from striking rearward blows to the pin carrying member, but is permitted to impart forward blows to the pin carrying device by striking against the forward end of the cylinder or front head.

The apparatus is shown in one of its preferred forms in the accompanying drawings, in which—

Figure 1 is a side elevation of the extractor,

Figure 2 is a longitudinal sectional elevation of the extractor, and

Figure 3 is a transverse sectional view on the line 3—3 of Figure 1 looking in the direction of the arrows.

In the form of device illustrated in the drawings, the extractor is of the hand held form for convenience of operation and the cylinder A containing the impact members in the form of a reciprocating piston B and the anvil block C is provided with the front head D and back head E held together by the usual side rods F. In this instance, the side rods engage the front head D and lugs G on the handle H.

The anvil block C is provided with a forwardly extending shank J and a rearward impact portion in the form of a collar K and as shown, the anvil shank J passes through the hollow piston B. A cushioning spring L surrounding the guide O is preferably provided in the recess P in the back head E between the rearward end of the anvil block and the handle H to reduce the impact upon the hand of the operator. A flange Q at the rearward end of the anvil block seats upon the shoulder R inside the back head to limit the forward movement of the anvil block.

The front end of the anvil block shank J is provided with means for holding and gripping a core rod S or other pin or tool to be extracted. This gripping means may be in the form of a chuck comprising a chuck cylinder T threaded to the end of the anvil shank J, a chuck piston U in the cylinder T, a chuck body V having a tapering bore and provided with exterior screw threads W, and a split chuck sleeve X secured over the cylinder T and body V by means of the sleeve bolt Y to hold the parts in position. The chuck body V is provided with the serrated chuck keys Z preferably three in number having notched heads $a$ adapted to engage the flanged head $b$ of the chuck piston U. Pressure fluid supplied to the chuck cylinder T forces the piston U forwardly and causes the chuck keys Z to grip the rod or pin S. Springs $c$ in the body V bear against the piston U to retract the piston when pressure fluid is shut off from the cylinder T. The neck $d$ of the chuck cylinder T is preferably of angular cross section, in this instance shown as hexagonal and a chuck coupling $e$ is preferably sleeved over the neck $d$ and the hexagonal extension $f$ on the front head D bearing against the shoulder $g$ on the front head, leaving a clearance space $h$ between the neck $d$ and extension $f$ so that by pushing forwardly on the handle H of the machine, the chuck coupling $e$ may be pushed forward on the neck $d$ to bring the front head extension $f$ against the neck $d$ for the purpose of permitting the hammer piston B to impart blows of impact through the front head D and thence to the chuck to drive the pin or rod S forwardly as desired for loosening purposes. In such case, the impact portion or collar K of the anvil block is retracted within the recess P in the back head E so that the hammer piston B does not strike the collar K of the anvil block. The front head D is preferably provided with the raised striking portion $j$ and the hammer piston B is likewise preferably provided with the raised striking portions $k$ at each end.

Pressure fluid for actuating the hammer may be controlled in any suitable manner as by means of the throttle valve $o$ in the valve chest $p$ and in the position of the parts shown in Figure 2 pressure fluid supplied through the interior $q$ of the throttle valve from the inlet $r$ may pass to the hammer cylinder. Spring pressed inlet poppet valves $s$ and $t$ control the admission of fluid to each end of the cylinder and the exhaust port $u$ is controlled by the piston. This exhaust port $u$ preferably has a spring pressed exhaust cap $v$ for the outlet to atmosphere. The valves $s$ and $t$ project slightly into the cylinder so that they are moved by the piston.

A passage $w$ in the back head E leads from the inlet port $x$ through the rear end of the cylinder to the chamber P in the back head E so that pressure fluid is supplied for aiding the spring L in holding the anvil block in its forward position.

Pressure fluid is supplied to the chuck cylinder T behind the chuck piston U through the passage $y$ in the cylinder leading from the inlet $r$ to a chamber $z$ in the front head D, and a central passage 2 in the anvil block shank J communicates through radial ports 3 with said chamber $z$. A hollow threaded locking plug 4 is screwed into the split open forward end of the anvil shank J so that pressure fluid is permitted to pass from the inlet $r$ directly through the passages indicated to the interior of the chuck cylinder T. The pressure fluid passing to the chuck cylinder T is controlled by the needle valve 5 set into the side of the front head V as indicated in detail in Figure 3. Leak ports 6 are provided in the chuck piston U so that when pressure fluid is shut off from the chuck cylinder T the leakage from the cylinder through the leak ports 6 will quickly release the pressure and permit the rod or pin S to be removed from the chuck.

In the operation of the extractor, let it be assumed that the parts are in the position indicated in Figure 2 and that a core rod S is gripped in the chuck. Pressure fluid will pass from the inlet through the throttle valve $o$ and inlet port $x$ to the rearward end of the cylinder A driving the piston B forwardly. As the piston passes opposite the forward inlet valve $t$ said valve will be opened to admit pressure fluid to the forward end of the cylinder for returning the piston and the rearward inlet valve $s$ will be closed. On the return stroke the piston strikes a blow of impact against the head or collar K of the anvil for pulling the rod or pin out of the sand core or other means which may be holding the rod. These blows of impact are rapidly repeated as long as desired.

In case it may be desired to strike forward blows for loosening the pin or rod the cylinder A is pushed forwardly until the extension $f$ on the front head D bears against the neck $d$ of the chuck cylinder T so that the head K of the anvil is removed from the path of the piston B and blows of impact struck upon the front head D are transmitted through the chuck parts to the rod S tending to loosen said rod so that it may be more readily extracted by the rearwardly directed blows of the piston when they are again imparted to the anvil.

I claim:

1. In a fluid actuated hammer type extractor, the combination of a hammer cylinder, a rod or pin to be extracted from means holding the same, an anvil block mounted in the cylinder and free to move longitudinally therein provided with means for gripping the said rod or pin, a fluid actuated reciprocating hammer piston in the cylinder surround the anvil block, means for causing automatic reciprocation of said hammer piston to impart rearward blows of impact directly to said anvil block for extracting the said rod or pin, and means for shifting the anvil block longitudinally in the cylinder out of the path of the piston to permit the hammer piston to impart forward blows of impact to the pin gripping means, without striking the anvil block.

2. In a fluid actuated hammer type extractor, the combination of a hammer cylinder, a rod or pin to be extracted from means holding the same, two relatively movable impact members in the cylinder, one having an impact portion at one end and a pin gripping device at the other end, the other member being automatically reciprocated by pressure fluid to impart rearward blows of impact directly to the impact portion of the pin carrying member, for extracting the pin, and means for relatively shifting the cylinder and pin carrying member longitudinally to permit the other impact member to impart forward blows of impact through the forward end of the hammer cylinder to the pin gripping device, while at the same time removing the rearward impact portion of the pin carrying member from the path of the hammer.

In testimony whereof I have signed this specification.

LEWIS C. BAYLES.